(12) United States Patent
Niki et al.

(10) Patent No.: US 7,099,757 B2
(45) Date of Patent: Aug. 29, 2006

(54) CONTROL APPARATUS FOR HYBRID VEHICLE

(75) Inventors: Manabu Niki, Utsunomiya (JP);
Masanobu Asakawa, Utsunomiya (JP);
Kohei Hanada, Utsunomiya (JP);
Minoru Suzuki, Shimotsuga-gun (JP);
Teruo Wakashiro, Shioya-gun (JP);
Takahiro Yonekura, Utsunomiya (JP);
Naoto Sen, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 10/882,382

(22) Filed: Jul. 2, 2004

(65) Prior Publication Data

US 2005/0000479 A1    Jan. 6, 2005

(30) Foreign Application Priority Data

Jul. 4, 2003    (JP) .............................. 2003-192315
Dec. 2, 2003    (JP) .............................. 2003-403211

(51) Int. Cl.
*B60K 6/04*    (2006.01)

(52) U.S. Cl. ..................... 701/22; 180/65.2; 180/65.8

(58) Field of Classification Search .............. 701/22, 701/54, 93, 96; 180/65.2–65.4, 65.8, 170, 180/179; 123/349, 352
See application file for complete search history.

(56) References Cited

U.S. PATENT DOCUMENTS

| | | | |
|---|---|---|---|
| 5,425,335 A | | 6/1995 | Miyamoto et al. |
| 5,789,881 A | * | 8/1998 | Egami et al. ............... 318/139 |
| 6,278,915 B1 | * | 8/2001 | Deguchi et al. ............ 701/22 |
| 6,307,277 B1 | * | 10/2001 | Tamai et al. .............. 290/40 C |
| 6,510,370 B1 | | 1/2003 | Suzuki et al. |
| 6,886,649 B1 | * | 5/2005 | Wakashiro et al. ........ 180/65.2 |
| 6,892,128 B1 | * | 5/2005 | Asakawa et al. ........... 701/103 |
| 2001/0016165 A1 | | 8/2001 | Shimabukuro et al. |
| 2004/0148071 A1 | * | 7/2004 | Itoh et al. ..................... 701/22 |
| 2005/0003925 A1 | * | 1/2005 | Wakashiro et al. ............ 477/2 |

FOREIGN PATENT DOCUMENTS

| | | |
|---|---|---|
| JP | 60-138235 | 7/1985 |
| JP | 03-239638 | 10/1991 |
| JP | 06-193477 | 7/1994 |
| JP | 08-099560 | 4/1996 |
| JP | 9-207622 | 8/1997 |
| JP | 2001-15305 A | 6/2001 |
| JP | 2001-208177 A1 | 8/2001 |
| JP | 2002-247707 A1 | 8/2002 |

* cited by examiner

*Primary Examiner*—Gary Chin
(74) *Attorney, Agent, or Firm*—Arent Fox PLLC

(57) ABSTRACT

An FI/AT/MGECU, in a cylinders deactivation operating state during cruise control where the vehicle speed follows a predetermined target speed, regulates renewal on an addition side of a power plant required torque final value TQPPRQF, and in a case where a flag value of a torque hold flag F_CCKTQS showing to hold the power plant required torque final value TQPPRQF to a predetermined torque value related to a cylinder deactivation upper limit torque TQACS is a "1" (YES side in step S33), when the vehicle speed VP is decreased less than a value obtained by subtracting from a set vehicle speed VC which is the target vehicle speed during cruise control, a predetermined vehicle speed #ΔV (for example, #ΔV=3 km/h or the like) (YES side in step S35), the internal-combustion engine E is switched from a cylinders deactivation operation to an all cylinders operation. The fuel consumption efficiency is thus improved while keeping occupants in the vehicle from feeling discomfort with respect to travelling behavior.

5 Claims, 9 Drawing Sheets

CONTROL APPARATUS FOR HYBRID VEHICLE

BACKGROUND OF THE INVENTION

1. Field of the Invention

The present invention relates to a control apparatus for a hybrid vehicle which is mounted in a hybrid vehicle propulsion driven by jointly using an internal-combustion engine and a motor, and wherein the driving force from at least one of the internal-combustion engine and the motor is transmitted to the driving wheels.

Priority is claimed on Japanese Patent Application No. 2003-192315, filed Jul. 4, 2003, and No. 2003-403211, filed Dec. 2, 2003, the contents of which are incorporated herein by reference.

2. Description of Related Art

Conventionally, for example, in a hybrid vehicle which comprises an internal-combustion engine and a motor as a power source and which transmits the driving force from at least one of the internal-combustion engine and the motor to the driving wheels for traveling, a control apparatus for a hybrid vehicle has been well known which sets an engine torque required by the internal-combustion engine and a motor torque required by the motor according to the operating state of the vehicle.

In such a control apparatus for a hybrid vehicle, for example a control apparatus comprising a constant speed drive unit which drives a vehicle to travel so that the speed of the vehicle (vehicle speed) detected by a vehicle speed sensor follows a target vehicle speed which is a target value of the vehicle speed, has been known. Regarding this constant speed drive unit, the arrangement is such that, if a speed difference is generated between the vehicle speed detected and the target speed, a torque output from the internal-combustion engine and the motor is increased or decreased so as to counteract this speed difference (for example, Japanese Patent Application Unexamined Publication No. Hei 9-207622).

Incidentally, in a hybrid vehicle according to an example of the above conventional technique, for example, in the case where this comprises a variable cylinder internal-combustion engine capable of switching between an all cylinders operation which operates all cylinders and a partial cylinders deactivation operation which operates with some cylinders deactivated (cylinders deactivation operation) as an internal-combustion engine having high fuel consumption efficiency, and this is set in order to switch the all cylinders operation and the cylinders deactivation operation according to the operating state of the vehicle, then in a state where the vehicle is driven to travel so that the detected vehicle speed becomes the target vehicle speed, by simply increasing and decreasing only the torque from the internal-combustion engine and the motor so as to counteract the speed difference between the detected vehicle speed and the target vehicle speed, there is a likelihood that hunting which frequently switches between the all cylinders operation and the cylinders deactivation operation, occurs so that occupants in the vehicle may feel discomfort with respect to travelling behavior.

Moreover, in the control apparatus for a hybrid vehicle comprising such a variable cylinder internal-combustion engine, it is desired to improve the fuel consumption efficiency by enlarging the region which continues the cylinders deactivation operation with respect to, for example an amount of a vehicle state such as the accelerator pedal opening or the vehicle speed.

SUMMARY OF THE INVENTION

The present invention has been made in view of the above situation, and it is an object thereof to provide a control apparatus for a hybrid vehicle in which fuel consumption efficiency can be improved while keeping occupants in the vehicle from feeling discomfort with respect to travelling behavior.

In order to solve the above problem and achieve the related object, according to the present invention there is provided a control apparatus for a hybrid vehicle which comprises: a variable cylinder internal-combustion engine capable of switching between an all cylinders operation which operates all cylinders and a cylinders deactivation operation which operates with some cylinders deactivated, and a motor as a power source; and a power storage unit which transfers electric energy with the motor (for example, the battery 3 in the embodiment), and at least one of the variable cylinder internal-combustion engine and the motor is connected to driving wheels of the vehicle through a transmission so as to transmit a driving force to the driving wheels, wherein the control apparatus comprises: a fuel supply canceling device (for example, the cylinders deactivation controlling section 59 in the embodiment) which cancels fuel supply to the aforementioned some cylinders according to an operating state of the vehicle; a cruise control device (for example, the C/C (cruise control) unit 53 in the embodiment) which controls at least one of a cruise control to travel drive the vehicle so that the vehicle speed (for example, the vehicle speed VP in the embodiment) follows a predetermined target speed (for example, the set vehicle speed VC in the embodiment), and a cruise control to make the vehicle travel while maintaining a predetermined vehicular gap with respect to a preceding vehicle; an upper limit engine torque calculating device (for example, step S09 in the embodiment) which calculates an upper limit value of an engine torque capable of being output from the variable cylinder internal-combustion engine during the cylinders deactivation operation (for example, the cylinder deactivation upper limit ENG torque TQCS in the embodiment); an upper limit motor torque calculating device (for example, step S10 in the embodiment) which calculates an upper limit value of motor torque capable of being output from the motor during an assisting operation which assists the output of the variable cylinders internal-combustion engine by the output from the motor (for example, the energy management discharge torque limit for cylinder deactivation enlargement assistance TQMLTCSA in the embodiment); a torque limiting device (for example, step S19 in the embodiment) which limits a target torque for a power plant torque capable of being output from a power plant comprising the variable cylinder internal-combustion engine and the motor during operation of the fuel supply canceling device and the cruise control (for example, the power plant required torque final value TQPPRQF in the embodiment) to under a value equivalent to a predetermined torque related to a cylinder deactivation upper limit torque obtained by adding an upper limit value of the engine torque and an upper limit value of the motor torque; and a fuel supply cancel releasing device (for example, step S32 in the embodiment) which releases cancellation of the fuel supply to at least some of the cylinders among the cylinders to which the fuel supply is cancelled by the fuel supply canceling device, when the vehicle speed is decreased under a speed obtained by subtracting from the target speed, a predetermined speed (for example, the predetermined vehicle speed #ΔV in the embodiment) during operation of the torque limiting device.

According to the control apparatus for a hybrid vehicle having the above construction, the upper limit motor torque calculating device calculates the upper limit value of the motor torque capable of being output from the motor during the assisting operation, for example according to an energy state in high voltage electrical equipment constituting the power storage unit. Moreover, in the cylinders deactivation operating state during cruise control, in the case where the target torque for the power plant torque is increased, for example exceeding the cylinder deactivation upper limit torque obtained by the upper limit value of the engine torque and the upper limit value of the motor torque, the torque limiting device regulates renewal on the addition side of this target torque, and limits the target torque to under a value equivalent to the predetermined torque related to the cylinder deactivation upper limit torque. Furthermore, in the case where the vehicle speed is more than a speed obtained by subtracting from the target speed, a predetermined speed, the state which regulates the renewal on the addition side of the target torque is continued. In the case where the vehicle speed is decreased below a speed obtained by subtracting from the target speed, a predetermined speed, the fuel supply is started with respect to at least some of the cylinders among the cylinders in the deactivated state. That is, even in the case where the target torque for the power plant torque exceeds for example the cylinder deactivation upper limit torque, by allowing deceleration to a level where occupants in the vehicle can not feel discomfort, the cylinders deactivation operation can be continued and the timing for switching from the cylinders deactivation operation to the all cylinders operation can be delayed, so that fuel consumption efficiency can be improved.

Preferably, in the control apparatus for a hybrid vehicle having the above construction, the fuel supply cancel releasing device cancels the operation of the fuel supply canceling device to thereby switch the operating state of the variable cylinder internal-combustion engine from the cylinders deactivation operation to the all cylinders operation.

According to the control apparatus for a hybrid vehicle, even in the case where, accompanying the decrease in the vehicle speed due to the operation of the torque limiting device to under the speed obtained by subtracting from the target speed, the predetermined speed, for example the driver of the vehicle instructs to accelerate by operation of the accelerator pedal, it is possible to generate a driving force unerringly reflecting the driver's intention to accelerate at an appropriate timing.

Preferably, in the control apparatus for a hybrid vehicle having the above construction the fuel supply canceling device, in at least one case of: a case where the air/fuel ratio of an air-fuel mixture supplied to the variable cylinder internal-combustion engine is changed from a theoretical air/fuel ratio to a rich side state; a case where a shift operation is executed in the transmission; a case where a temperature of a catalyst which purifies exhaust gas of the variable cylinder internal-combustion engine departs from a predetermined activation temperature range; a case where a duration of the cylinders deactivation operation exceeds a predetermined duration; and a case where a rotating speed of the variable cylinder internal-combustion engine is decreased to under a predetermined rotating speed, releases the cancellation of the fuel supply to at least some of the cylinders among the cylinders to which the fuel supply is cancelled by the fuel supply canceling device.

According to the control apparatus for a hybrid vehicle, it is possible to control the operating state of the internal-combustion engine appropriately and flexibly according to the state of the vehicle.

Preferably, the control apparatus for a hybrid vehicle having the above construction further comprises: a fuel supply cancel prohibiting device (for example, the FI/AT/MGECU 36 in the embodiment) which, after the fuel supply cancel releasing device releases the cancellation of the fuel supply to at least some of the cylinders among the cylinders to which the fuel supply is cancelled by the fuel supply canceling device, prohibits execution of the cancellation of fuel supply to the at least some of the cylinders to which the cancellation of the fuel supply is released by the fuel supply cancel releasing device.

Furthermore, according to the control apparatus for a hybrid vehicle, it is possible to suppress the occurrence of hunting where canceling and releasing of canceling of the fuel supply is alternatively repeated, and it is possible to keep occupants in the vehicle from feeling discomfort with respect to the traveling behavior.

Preferably, in the control apparatus for a hybrid vehicle having the above construction, the upper limit value of motor torque is calculated according to a state of charge of the power storage unit.

According to the control apparatus for a hybrid vehicle, it is possible to appropriately continue processing of the cylinder deactivation enlargement assistance.

DETAILED DESCRIPTION OF THE INVENTION

Hereunder is a description of a control apparatus for a hybrid vehicle according to an embodiment of the present invention with reference to the appended drawings.

Figure 1:
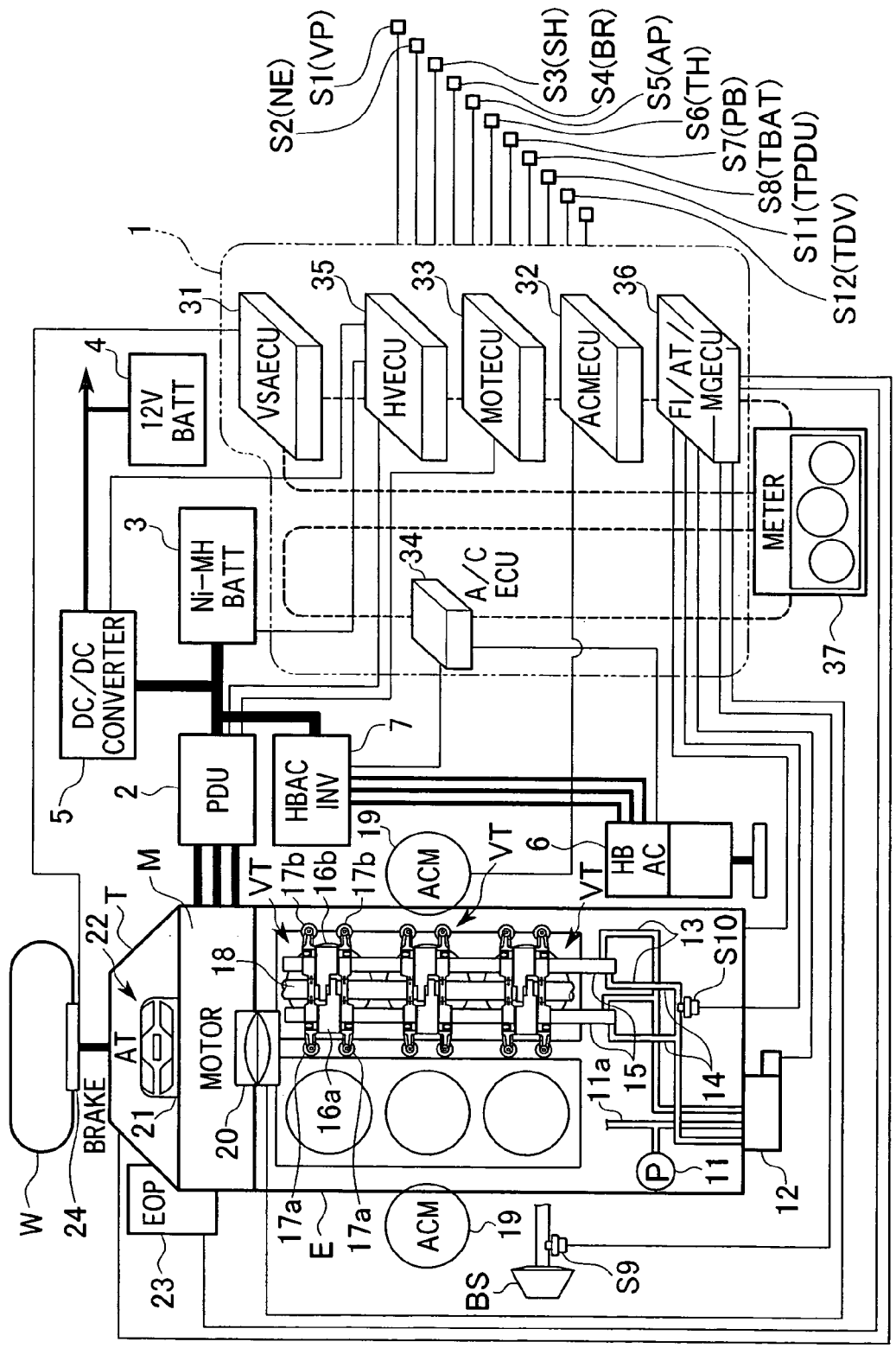
FIG. 1 shows a construction of a control apparatus for a hybrid vehicle according to an embodiment of the present invention.

FIG. 1 shows a parallel hybrid vehicle according to the embodiment of this invention having a construction where an internal-combustion engine E, a motor M, and a transmission T are connected directly in series. The driving force of both the internal-combustion engine E and the motor M is transmitted, for example, from the transmission T such as an automatic transmission (AT) or manual transmission (MT), to the driving wheels W of the vehicle, via a differential gear (not shown) which distributes the driving force between driving wheels W on the right and the left (front wheels or rear wheels). Moreover, when a driving force is transmitted from the driving wheel W side to the motor M side at the time of deceleration of the hybrid vehicle, the motor M functions as a generator to generate so-called regenerative braking, and the kinetic energy of the vehicle body is recovered as electrical energy.

The motor M, being for example a three-phase brushless DC motor or the like, is connected to a power drive unit (PDU) 2. The power drive unit 2 comprises, for example a PWM inverter involving pulse width modulation (PWM), installed with a bridge circuit being a bridge connected using a plurality of transistor switching elements, and is connected to a nickel-hydrogen battery (battery) 3 of a high voltage system which transfers the power for the motor M (the power supply which is supplied to the motor M during the power running operation (driving or assisting) of the motor M, or the regenerated power which is output from the motor M during the regenerative operation).

Moreover, the drive and regenerative operation are performed by the power drive unit 2 receiving control instructions from a control unit 1. That is, for example when driving the motor M, based on torque instructions input from the control unit 1, the power drive unit 2 converts the DC power output from the battery 3 into three-phase AC power and supplies this to the motor M. On the other hand, during the regenerative operation of the motor M, the three-phase AC power output from the motor M is converted into the DC power and the battery 3 is charged.

Furthermore, an auxiliary battery 4 of 12 volts for driving various accessories, is connected to the power drive unit 2 and the battery 3 in parallel via a downverter 5 which is a DC-DC converter. The downverter 5 is controlled by the control unit 1 and charges the auxiliary battery 4 by lowering the voltage of the power drive unit 2 or the battery 3.

Moreover, a crankshaft of the internal-combustion engine E is connected, for example through a belt or a clutch to a rotation shaft of an air conditioning motor (not shown) equipped in a hybrid air conditioning compressor (HBAC) 6. This air conditioning motor is connected to an air conditioning inverter (HBAC INV) 7. The air conditioning inverter 7 is connected in parallel to the power drive unit 2 and the battery 3, and under the control of the control unit 1, converts the DC power output from the power drive unit 2 and the battery 3 into three-phase AC power to supply to the air conditioning motor so as to drive control the hybrid air conditioning compressor 6.

That is, in the hybrid air conditioning compressor 6, the driving load, for example the discharge of the refrigerant, is variably controlled under the driving force from at least one of the internal-combustion engine E and the air conditioning motor during the power running operation of the air conditioning motor. Here, "hybrid" in the hybrid air conditioning compressor 6 means that it can be driven by either one of the internal-combustion engine E and the motor M.

Between the internal-combustion engine E and the air conditioning motor, there are for example, a crankshaft pulley integrally provided with the crankshaft of the internal-combustion engine E, a driving shaft pulley paired with the crankshaft pulley and integrally provided with a driving shaft connectable with the rotation shaft of the air conditioning motor through a clutch, and a belt spanning between the crankshaft pulley and the driving shaft pulley.

That is, between the crankshaft pulley and the driving shaft pulley, the driving force is transmitted through the belt.

Moreover, the internal-combustion engine E is a so-called SOHC V6 cylinder engine, of a construction having three cylinders on one bank comprising a variable valve timing mechanism VT enabling a cylinder deactivation operation, and a construction having three cylinders on the other bank comprising a normal valve operating mechanism (not shown) which does not perform the cylinder deactivation operation. Furthermore, the three cylinders enabling the cylinder deactivation operation have a construction such that respective two inlet valves and two exhaust valves are able to maintain the closed state by means of the variable timing mechanism VT, via an oil pressure pump 11, a spool valve 12, a cylinder deactivation side path 13, and a cylinder deactivation cancellation side path 14.

That is, the internal-combustion engine E may be switched between three cylinders operation (cylinder deactivation operation) in the state such that the three cylinders on one side bank are deactivated, and six cylinders operation (all cylinders operation) such that all six cylinders on both side banks are driven.

Specifically, if operating oil being supplied from the oil pressure pump 11 through the lubrication system piping 11a to the engine lubrication system is partially supplied via the spool valve 12 comprising a solenoid controlled by the control unit 1, to the cylinder deactivation side path 13 on the bank capable of cylinder deactivation operation, a cam lift rocker arm 16a (16b) and valve drive rocker arms 17a (17b) which are supported on the respective rocker shafts 15 and were integrally driven, are able to be driven separately. Therefore, the driving forces of the cam lift rocker arms 16a and 16b driven by the rotation of the cam shaft 18 are not transmitted to the valve drive rocker arms 17a and 17b, so that the inlet valves and the exhaust valves remain in the closed state. Accordingly the cylinder deactivation operation where the inlet valves and the exhaust valves of the three cylinders become in the closed state may be performed.

The internal-combustion engine E is mounted via a damping device (ACM: Active Control Engine Mount) 19 onto the vehicle so that the damping device 19 can suppress the generation of vehicle vibration accompanied with the operating state of the internal-combustion engine E, that is the switching of the three cylinders operation (cylinder deactivation operation) and the six cylinders operation (all cylinders operation).

Moreover, this internal-combustion engine E comprises an electronic throttle control system (ETCS) 20 which electronically controls a throttle valve (not shown).

The ETCS 20 drives an ETCS driver according to the throttle opening calculated in the control unit 1 based for example on the accelerator pedal opening related to the operating amount of the accelerator pedal (not shown) by a driver, the operating state of the vehicle such as the vehicle travelling speed (vehicle speed) VP or the engine speed NE, and on the torque distribution between the internal-combustion engine E and the motor M, so as to directly control the throttle valve.

For example the transmission T being the automatic transmission (AT) is constructed to comprise a torque converter 22 equipped with a lock-up clutch (LC) 21, and an electric oil pump 23 which generates the oil pressure for drive controlling the torque converter 22 and for the shifting operation of the transmission T.

The electric oil pump 23 is drive controlled by the control unit 1 with the power supply from the battery 3.

The torque converter 22 transmits the torque by a spiral flow of the operating oil (ATF: Automatic Transmission Fluid) enclosed inside. In an LC_OFF state where the engagement of the lock-up clutch 21 is cancelled, the torque is transmitted (for example, amplification transmission) from the rotation shaft of the motor M to the input shaft of the transmission T via the operating oil.

Furthermore, in an LC_ON state where the lock-up clutch 21 is set up in the engagement state, the rotation driving force is directly transmitted from the rotation shaft of the motor M to the input shaft of the transmission T and not via the operating oil.

Moreover, a booster BS is linked to the brake pedal (not shown). A master power internal negative pressure sensor S9 which detects the brake master power internal negative pressure is provided in the booster BS.

Moreover, the driving wheel W comprises a brake device 24. The brake device 24 suppresses the generation of rapid behavioral change of the vehicle by control of the control unit 1. For example, it prevents slipping of the driving wheel W on a slippery road surface or the like, suppresses side slip such as oversteering or understeering, prevents the driving wheel W from being in a locked state during braking, ensures the desired driving force and the steering performance of the vehicle, stabilizes the posture of the vehicle, and assists with travelling by means of a creep force, for example, prevents the vehicle from moving backward on a slope when deactivating the internal-combustion engine E.

Inputs to the control unit 1 are: for example: a detection signal from a vehicle speed sensor S1 which detects the travelling speed of the vehicle VP, a detection signal from an engine speed sensor S2 which detects the engine speed NE, a detection signal from a shift position sensor S3 which detects the shift position SH of the transmission T, a detection signal from a brake switch S4 which detects the operating state BR of the brake (Br) pedal, a detection signal from an accelerator pedal opening sensor S5 which detects the accelerator pedal opening AP according to the operation amount of the accelerator pedal, a detection signal from a throttle opening sensor S6 which detects the throttle opening TH, a detection signal from an intake pipe pressure sensor S7 which detects the intake pipe pressure PB, a detection signal from a battery temperature sensor S8 which detects the temperature TBAT of the battery 3, a detection signal from the master power internal negative pressure sensor S9, a detection signal from a POIL sensor S10 which detects the oil pressure of the cylinder deactivation cancellation side path 14 when deactivating the cylinders, a detection signal from a PDU temperature sensor S11 which detects the temperature TPDU of the power drive unit 2, and a detection signal from a DV temperature sensor S12 which detects the temperature TDV of the downverter 5.

Moreover, the control unit 1 comprises: for example: a VSA (Vehicle Stability Assist) ECU 31 which drive controls the brake device 24 to stabilize the behavior of the vehicle, an ACMECU 32 which drive controls the damping device 19 to suppress the generation of car body vibration caused by the operating state of the internal-combustion engine E, a MOTECU 33 which controls the driving and the regenerative operation of the motor M, an A/CECU 34 which drive controls the air conditioning hybrid air conditioning compressor 6 and the air conditioning inverter 7, and an HVECU 35 which monitors and protects the high voltage electrical equipment system comprising for example the power drive unit 2, the battery 3, the downverter 5, and the motor M, and controls the operation of the power drive unit 2 and the downverter 5, and a FI/AT/MGECU 36 The respective VSAECU 31 to 36 are mutually connected communicably. The respective ECUs 31 to 36 are connected to a meter 37 comprising instruments which display the amount of the respective types of states.

Figure 2:
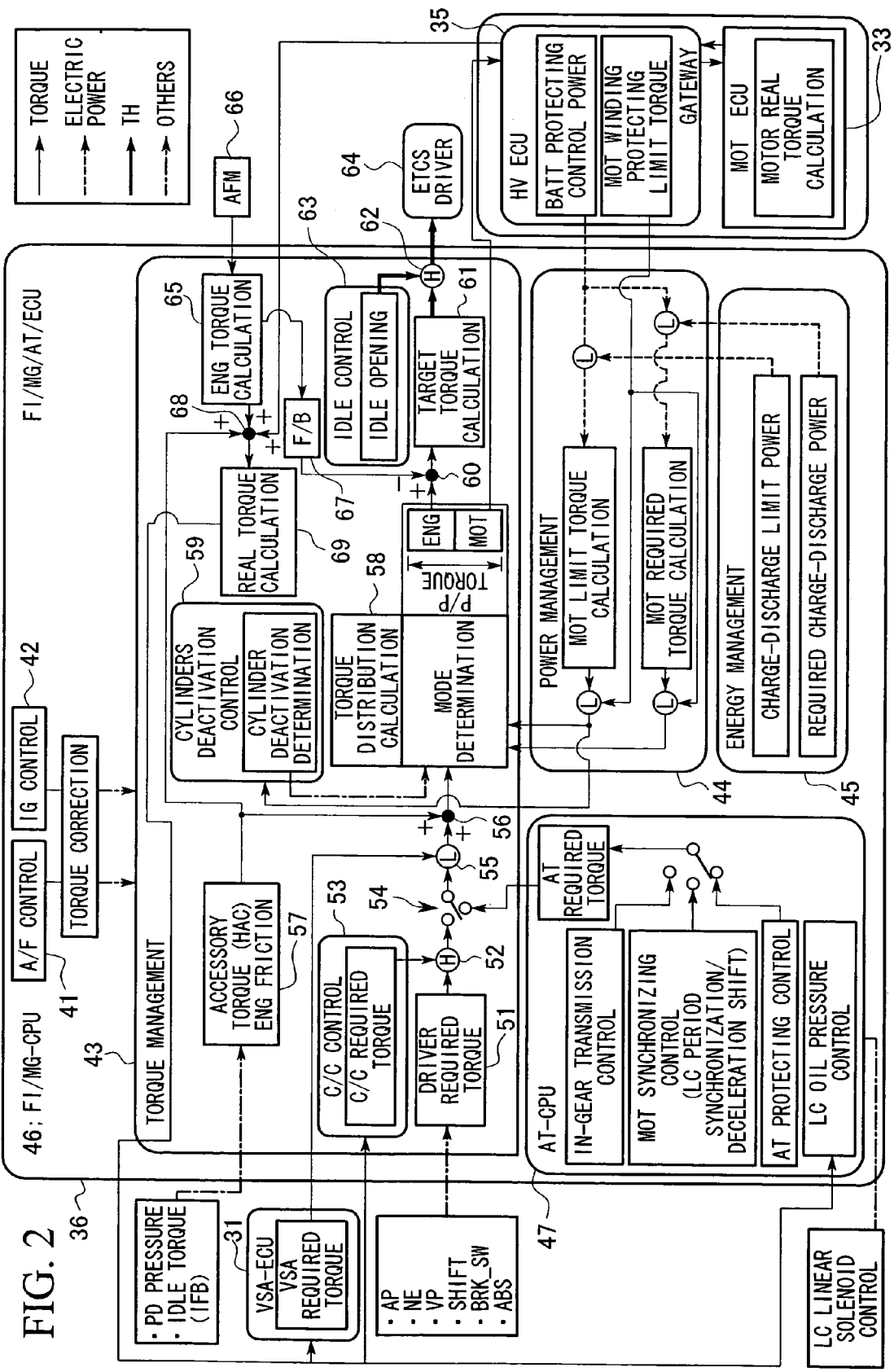
FIG. 2 is a block diagram of the control unit shown in FIG. 1.

For example, as shown in FIG. 2, the FI/AT/MGECU 36 comprises; a FI/MG-CPU 46 installed with an A/F (air/fuel ratio) control unit 41 and an IG (ignition) control unit 42 which control the fuel supply to and the ignition timing of the internal-combustion engine E, a torque management section 43, a power management section 44, and an energy management section 45; and for example an AT-CPU 47 which controls the shifting operation of the transmission T, the operating state of the lock-up clutch 2, and the like.

In the torque management section 43, a driver required torque calculating section 51 calculates the torque value required by a driver of the vehicle (driver required torque) depending on the operation amount of the accelerator by the driver, for example based on respective detection signals from the accelerator pedal (AP) opening, the engine speed NE, the vehicle travelling speed VP, the shift position SH, the operating state of a brake pedal BRK_SW, and the operating state ABS of an antilock brake system which prevents the driving wheels W from being locked during vehicle braking by the brake device 24, and outputs this torque value to a first torque selecting section 52.

Moreover, a C/C (cruise control) unit 53 calculates the torque value (C/C required torque) targeted during the travel control satisfying predetermined traveling conditions previously set according to the input operation of the driver, that is cruise control, for example, such as the constant speed travelling control which controls the internal-combustion engine E and the motor M so that the vehicle travelling speed VP detected in a vehicle speed sensor S1 becomes the target vehicle speed which is the target value of the travelling speed of the vehicle, and follow travel control for following a preceding vehicle while maintaining a predetermined vehicular gap, and outputs the torque value to the first torque selecting section 52.

The first torque selecting section 52 selects the greater torque value of the driver required torque or the C/C required torque, and outputs to the torque switching section 54. Therefore, for example even during cruise control, in the case where the driver required value according to the accelerator operation of the driver of the vehicle is over the C/C required torque, the torque according to the driver required value is output.

The torque switching section 54 selects either one of the torque value input from the first torque selecting section 52 and the AT required value input from the AT-CPU 47, and outputs to a second torque selecting section 55.

The AT-CPU 47 selects either one of the torque values as the AT required torque among, for example; a torque value set during the shifting operation of the transmission T, a torque value targeted when performing synchronizing control which synchronize the period of the input shaft of the transmission T and the rotating speed of the motor M during driving the lock-up clutch 21 or shifting the speed such as shifting down, and a torque value set during protection control of the transmission T in the case where a driver operates the accelerator pedal and the brake pedal at the same time.

Moreover, the AT-CPU 47 electronically controls the oil pressure which drives the lock-up clutch 21 by an LC linear solenoid, and it is possible to set the operation, in addition to the LC_ON state where the lock-up clutch 21 is in the engagement state and the LC_OFF state where the engagement is cancelled, to an intermediate state which generates an appropriate smoothness in the lock-up clutch 21.

The second torque selecting section 55 selects the smaller torque value of the torque value input from the torque switching section 54 and the VSA required torque input from the VSAECU 31, then sets this torque value as a torque of the crankshaft (crankshaft torque), that is the target torque value with respect to the actual rotation of the driving wheels W, and outputs to a first adding section 56.

Moreover, an auxiliary torque-ENG friction calculating section 57 calculates, for example the auxiliary torque (HAC) required for driving the accessories based on the protrusive pressure (PD) of the air conditioner, calculates the torque value in relation to the engine (ENG) friction of the internal-combustion engine E based on the increased amount of the engine friction in a low temperature state compared to a standard for the engine friction value after termination of warming up of the internal-combustion engine E, and outputs to the first adding section 56.

The first adding section 56 sets the value obtained by adding the crank terminal torque and the torque value input from the auxiliary torque -ENG friction calculating section 57, as the power plant (P/P) torque which is the target torque for the torque output from the power plant (that is, the internal-combustion engine E and the motor M), and outputs to a torque distribution calculating section 58.

The torque distribution calculating section 58 selects the required torque mode for instructing the predetermined operating state of the internal-combustion engine E and the motor M based on the cylinder deactivation determination output from the cylinder deactivation control unit 59 for determining whether the cylinder deactivation operation of the internal-combustion engine E should be executed or not, and the limit torque and the required torque for the motor M output from the power management section 44, and according to the selection result, sets the distribution of the power plant torque (P/P) with respect to the respective torque instructions of the internal-combustion engine E and the motor M.

To the cylinder deactivation control unit 59 is input the limit torque for the motor M output from the power management section 44 described later, and according to the limit torque for the motor M, the cylinder deactivation control unit 59 determines whether the cylinder deactivation operation should be executed or not.

The power management section 44 calculates, for example the motor (MOT) limit torque based on the smaller power of the battery (BATT) protecting limit power output from the HVECU 35 and the charge-discharge limit power output from the energy management section 45, then sets the smaller one of the calculated motor limit torque and the motor (MOT) winding protecting limit torque output from the HVECU 35 as the limit torque, and outputs to the torque distribution calculating section 58 and the cylinder deactivation control unit 59.

Moreover, the power management section 44 calculates, for example the motor (MOT) limit torque based on the smaller power of the battery (BATT) protecting limit power output from the HVECU 35 and the required charge-discharge power output from the energy management section 45, then sets the smaller one of the calculated motor limit torque and the motor (MOT) winding protecting limit torque output from the HVECU 35 as the required torque, and outputs to the torque distribution calculating section 58.

The charge-discharge limit power and the required charge-discharge power output from the energy management section 45 are, for example the limited amount and the required amount with respect to charge and discharge set according to the state of charge of the battery 3 and the auxiliary battery 4.

Moreover, the battery (BATT) protecting limit power output from the HVECU 35 is, for example the limit value of the output power of the battery 3 set according to the temperature state of the battery 3, the auxiliary battery 4, and the other high voltage electrical equipment. The motor (MOT) winding protecting limit torque is the limit value of the output torque of the motor M set according to the temperature state of the motor M.

The torque instruction of the internal-combustion engine E calculated by the 20 torque distribution calculating section 58 is input into a subtracting section 60. The subtracting section 60 inputs the value obtained by subtracting the torque value input from the feedback (F/B) processing section 67 described later from the torque instruction of the internal-combustion engine E, to a target TH calculating section 61. The target TH calculating section 61 calculates the target value for the electronic throttle opening TH in relation to the drive of the ETCS driver based on the input torque value, and outputs to a third torque selecting section 62.

The third torque selecting section 62 selects the greater throttle opening value of the target value of the electronic throttle opening TH input from the target TH and the idle opening output from the idle control unit 63, and outputs this throttle opening value to the ETCS driver 64.

The idle opening output from the idle control unit 63 is, for example, a limit value with respect to the throttle opening TH for preventing the engine speed NE from being less than the predetermined rotating speed during the idle operation of the internal-combustion engine E.

Moreover, to the ENG torque calculating section 65 in the torque management section 43 is input a detection signal intake air amount (or supplied oxygen amount) of the internal-combustion engine E detected by an airflow meter (AFM) 66. The ENG torque calculating section 65 calculates the ENG torque output from the internal-combustion engine E based on the detection value of the intake air amount, and outputs to the feed back (F/B) processing section 67 and a second adding section 68.

The feed back (F/B) processing section 67, with respect to the torque instruction of the internal-combustion engine E calculated in the torque distribution calculating section 58, corrects for calculation errors of ENG torque based for example on the detection value of the airflow meter 66, response characteristic or aged deterioration of the internal-combustion engine E, performance irregularities during mass production of the internal-combustion engine E and the like, by feed back processing, and inputs the ENG torque calculated in the ENG torque calculating section 65 to the subtracting section 60.

A third adding section 68 inputs the torque value obtained by adding; the ENG torque calculated in the ENG torque calculating section 65, the torque value input from the auxiliary torque-ENG friction calculating section 57, and the motor real torque input from the MOTECU 33, to the real torque calculating section 69. The real torque calculating section 69 calculates the real torque value which is actually output from the power plant (that is, the internal-combustion engine E and the motor M) based on the input torque value.

To the MOTECU 33 is input the torque instruction of the motor M calculated by the torque distribution calculating section 58 in the torque management section 43, via the HVECU 35. The MOTECU 33 calculates the motor real torque which is actually output from the motor M based on the input torque value, and inputs to the third adding section 68 in the torque management section 43, via the HVECU 35.

Moreover, the real torque value calculated in the real torque calculating section 69 is input to the AT-CPU 47, and based on this real torque value, the oil pressure which drives the lock-up clutch 21 is electronically controlled by an LC linear solenoid.

The respective torque values calculated in the torque management section 43 are corrected according to the ignition timing, the air/fuel ratio, and the presence/absence of the fuel cut (fuel supply cancellation) of the internal-combustion engine E which are controlled in the A/F (air/fuel ratio) control unit 41 and the IG (ignition) control unit 42.

The control apparatus for a hybrid vehicle according to the present embodiment comprises the above construction. Next is a description of an operation of this control apparatus for a hybrid vehicle, particularly, processing which switches the operating state of the internal-combustion engine E during cruise control, that is switches between the all cylinders operation and the cylinders deactivation operation.

Hereunder is a description of processing which sets the flag value of a torque hold flag F_CCKTQS showing whether it is possible to execute the torque hold processing which enlarges the cylinders deactivation operation region with respect to the vehicle speed VP during cruise control or not, with reference to the flowcharts.

Figure 3:
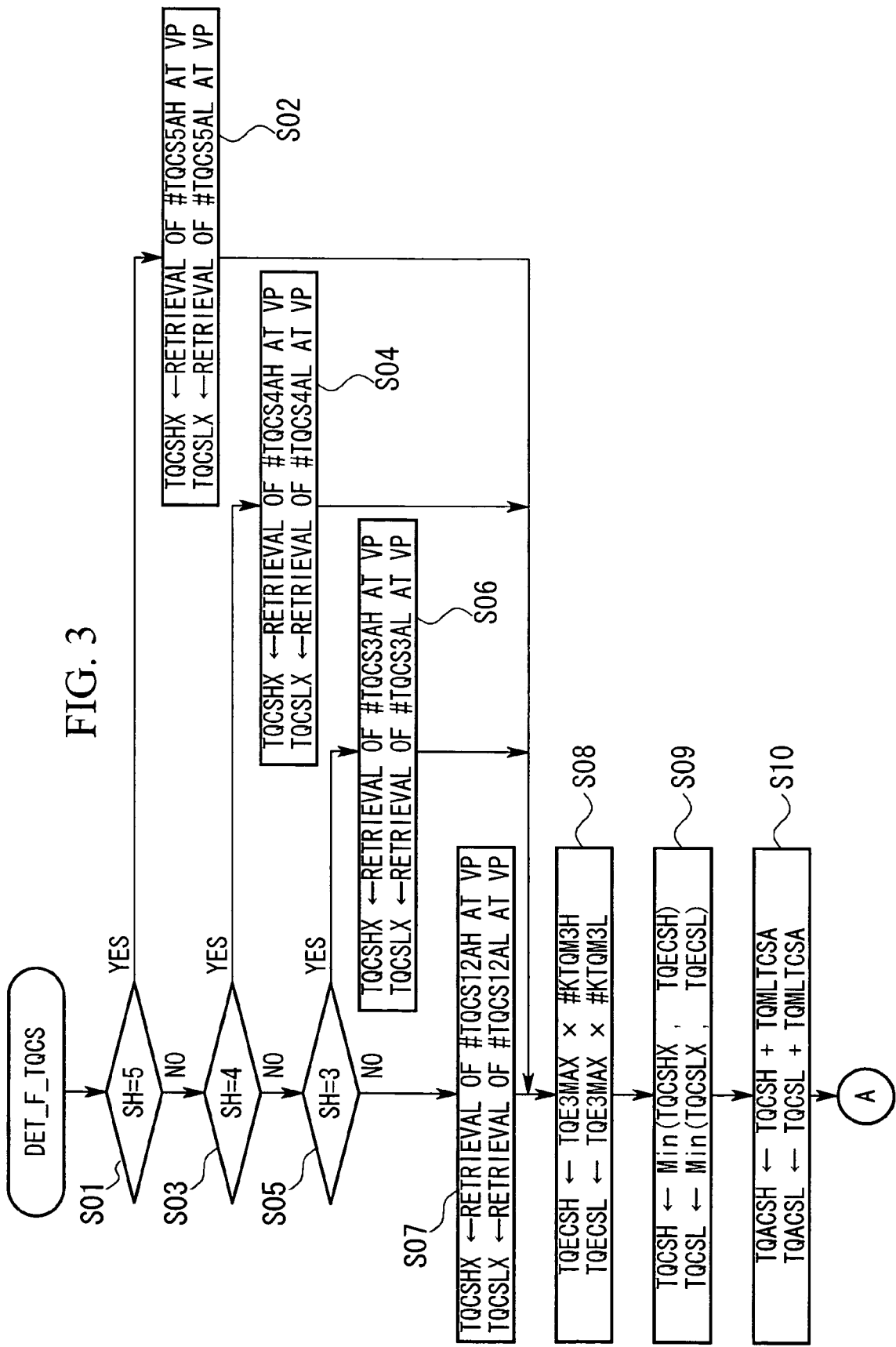
FIG. 3 is a flowchart showing a processing which sets a torque hold flag F_CCKTQS.

Firstly, in step S01 shown in FIG. 3, it is determined whether the shift position SH of the transmission T detected by the shift position sensor S3 is 5-speed or not.

If this determination is "NO", the flow proceeds to step S03 described later.

On the other hand, if this determination is "YES", the flow proceeds to step S02, where a table of the 5-speed cylinder deactivation upper limit ENG torque #TQCS 5AH/L having hysteresis which changes according to the vehicle speed VP is retrieved so as to set an NV cylinder deactivation upper limit ENG torque TQCSX having hysteresis (that is, a high NV cylinder deactivation upper limit ENG torque TQCS HX and a low NV cylinder deactivation upper limit ENG torque TQCS LX), and the flow proceeds to step S08 described later. Here, the NV cylinder deactivation upper limit ENG torque TQCSX is, for example the upper limit of ENG torque for permitting execution of the cylinders deactivation operation in a state where noise, vibration, or the like generated in the internal-combustion engine E in the cylinders deactivation operating state are controlled to under predetermined values.

Moreover, in step S03, it is determined whether the shift position SH of the transmission T detected by the shift position sensor S3 is 4-speed or not.

If this determination is "NO", the flow proceeds to step S05 described later.

On the other hand, if this determination is "YES", the flow proceeds to step S04, where a table of the 4-speed cylinder deactivation upper limit ENG torque #TQCS 4AH/L having hysteresis which changes according to the vehicle speed VP is retrieved so as to set the NV cylinder deactivation upper limit ENG torque TQCSX having hysteresis (that is, the high NV cylinder deactivation upper limit ENG torque TQCS HX and the low NV cylinder deactivation upper limit ENG torque TQCS LX), and the flow proceeds to step S08 described later.

Moreover, step S05, it is determined whether the shift position SH of the transmission T detected by the shift position sensor S3 is 3-speed or not.

If this determination is "YES", the flow proceeds to step S06, where a table of the 3-speed cylinder deactivation upper limit ENG torque #TQCS 3AH/L having hysteresis which changes according to the vehicle speed VP is retrieved so as to set the NV cylinder deactivation upper limit ENG torque TQCSX having hysteresis (that is, the high NV cylinder deactivation upper limit ENG torque TQCS HX and the low NV cylinder deactivation upper limit ENG torque TQCS LX), and the flow proceeds to step S08 described later.

On the other hand, if this determination is "NO", that is, in the case where the shift position SH is 1-speed or 2-speed, the flow proceeds to step S07, where a table of a 1, 2-speed cylinder deactivation upper limit ENG torque #TQCS12AH/L having hysteresis which changes according to the vehicle speed VP is retrieved so as to set the NV cylinder deactivation upper limit ENG torque TQCSX having hysteresis (that is, the high NV cylinder deactivation upper limit ENG torque TQCS HX and the low NV cylinder deactivation upper limit ENG torque TQCS LX), and the flow proceeds to step S08 described later.

Next, in step S08, a value obtained by multiplying the ENG maximum torque during cylinder deactivation TQE3MAX obtained by correcting the maximum value of ENG torque capable of being output from the internal-combustion engine E during cylinders deactivation operation according to the environment such as atmospheric pressure by, for example, the predetermined coefficient #KTQM3H, #KTQM3L having hysteresis for changing to decrease the ENG maximum torque during cylinder deactivation TQE3MAX based on the magnitude correlation of the fuel consumption efficiency between the all cylinders operation and the cylinders deactivation operation according to the retard amount for suppressing the knock generation in the internal-combustion engine E (for example, delayed amount of ignition timing), is set to the ENG torque during cylinder deactivation TQECS having hysteresis (that is, high ENG torque during cylinder deactivation TQECSH, and low torque during cylinder deactivation TQECSL).

Next, in step S09, the smaller one of the NV cylinder deactivation upper limit ENG torque TQCSX having hysteresis according to each shift position SH (that is, the high NV cylinder deactivation upper limit ENG torque TQCS HX and the low NV cylinder deactivation upper limit ENG torque TQCS LX), and the ENG torque during cylinders deactivation TQECS having hysteresis (that is, the high ENG torque during cylinders deactivation TQECSH and the low ENG torque during cylinders deactivation TQECSL), is set to the cylinder deactivation upper limit ENG torque TQCS having hysteresis (that is, the high cylinder deactivation upper limit ENG torque TQCS H and the low cylinder deactivation upper limit ENG torque TQCS L).

Next, in step S10, a value obtained by adding to the cylinder deactivation upper limit ENG torque TQCS having hysteresis (that is, the high cylinder deactivation upper limit ENG torque TQCS HX and the low cylinder deactivation upper limit ENG torque TQCS LX), the energy management discharge torque limit for cylinder deactivation enlargement assistance TQMLTCSA, being for example the upper limit of the motor torque set corresponding to the energy state in high voltage electrical equipment and the operating state of the vehicle, is set to the cylinder deactivation upper limit torque TQACS having hysteresis (that is, the high cylinder deactivation upper limit torque TQACSH and the low cylinder deactivation upper limit torque TQACSL).

Figure 4:
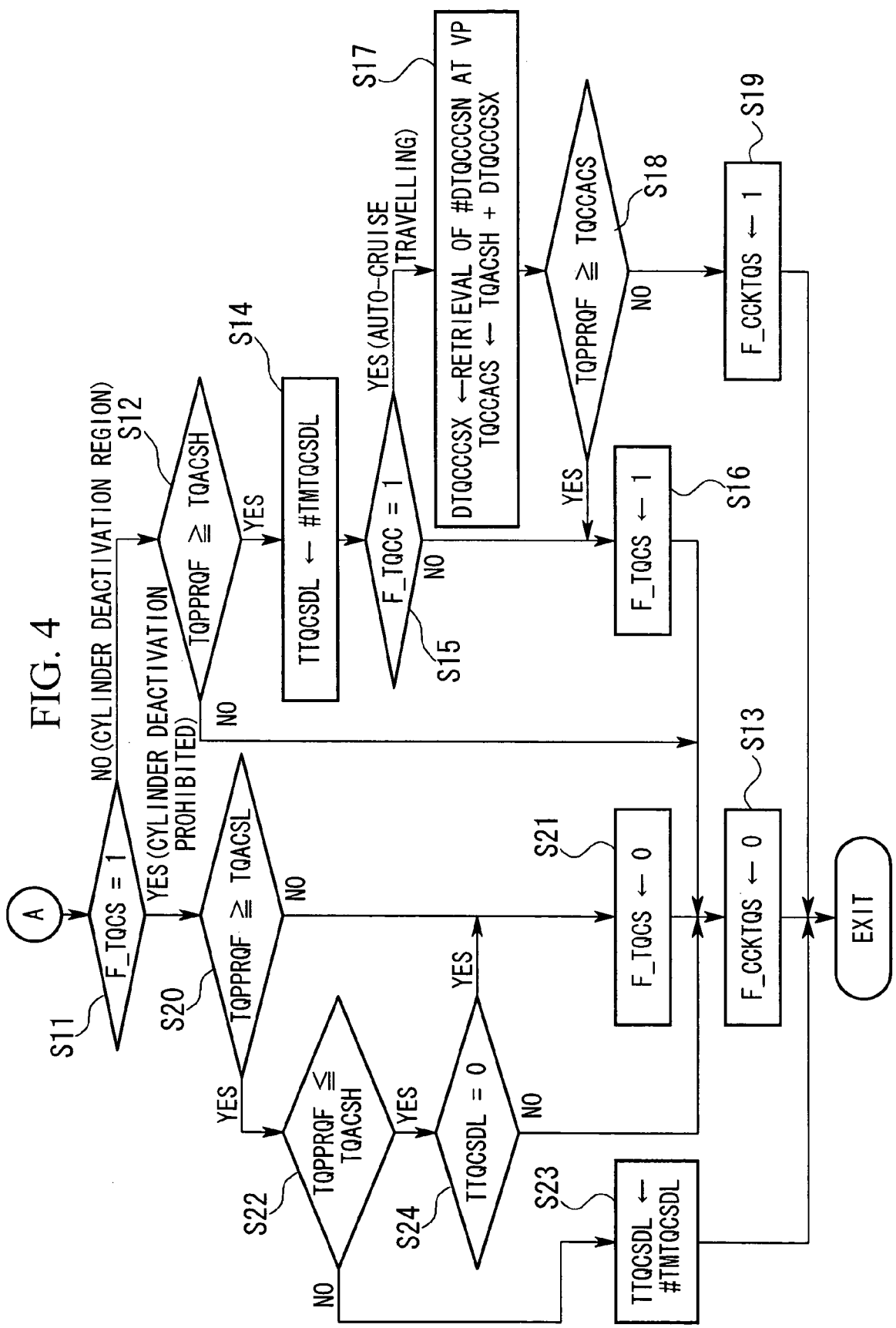
FIG. 4 is a flowchart showing a processing which sets the torque hold flag F_CCKTQS.

Next, in step S11 shown in FIG. 4, it is determined whether the flag value of an all cylinder region determination flag F_TQCS which shows that the power plant required torque final value TQPPRQF is in the all cylinder region, is "1" or not.

If this determination is "YES" (all cylinder region and cylinder deactivation is prohibited), the flow proceeds to step S20 described later.

On the other hand, if this determination is "NO" (cylinder deactivation region), the flow proceeds to step S12.

In step S12, it is determined whether the power plant required torque final value TQPPRQF is greater than or equal to the high cylinder deactivation upper limit torque TQACSH of the cylinder deactivation upper limit torque TQACS having hysteresis or not.

If the determination in step S12 is "YES", the flow proceeds to step S14 described later.

On the other hand, if the determination in step S12 is "NO", the flow proceeds to step S13, where, the power plant required torque final value TQPPRQF during cruise control, is set to a predetermined torque value, and for example a "0" is set to the flag value of the torque hold flag F_CCKTQS showing to hold for example to the torque value equivalent to the high cylinder deactivation upper limit torque TQACSH of the cylinder deactivation upper limit torque TQACS having hysteresis, and the series of processing is then terminated.

Moreover, in step S14, a predetermined time value #TMTQCSDL which is the delay time when switching the flag value of the all cylinder region determination flag F_TQCS from "1" to "0" is set to a delay time TTQCSDL.

Moreover, in step S15, it is determined whether the flag value of a cruise control determination flag F_TQCC which shows that the vehicle is traveling under cruise control, is "1" or not.

If this determination is "NO", the flow proceeds to step S16, where a "1" is set to the flag value of the all cylinder region determination flag F_TQCS, and the flow proceeds to step S13 described later.

On the other hand, if this determination is "YES" (autocruise travelling), the flow proceeds to step S17.

In step S17, a table of a torque addition term #DTQCCSN which varies according to the vehicle speed is retrieved, and a torque addition term DTQCCCSX is set, and a value obtained by adding this torque addition term DTQCCCSX to the high cylinder deactivation upper limit torque TQACSH of the cylinder deactivation upper limit torque TQACS having hysteresis is set to the cylinder deactivation upper limit torque during cruise control, TQCCACS.

Moreover, in step S18, it is determined whether the power plant required torque final value TQPPRQF is greater than or equal to a cylinder deactivation upper limit torque during cruise control TQCCACS or not.

If the determination in step S18 is "YES", the flow proceeds to step S16 described above.

On the other hand, if the determination in step S18 is "NO", the flow proceeds to step S19, where a "1" is set to the flag value of the torque hold flag F_CCKTQS, and the series of processing is terminated.

The torque addition term DTQCCCSX in step S17 described above is, for example, for keeping the flag value of the torque hold flag F_CCKTQS from fluctuating due to fluctuations in the power plant required torque final value TQPPRQF due to noise or the like.

Moreover, in step S20, it is determined whether the power plant required torque final value TQPPRQF is greater than or equal to the low cylinder deactivation upper limit torque TQACSL of the cylinder deactivation upper limit torque TQACS having hysteresis or not.

If this determination is "NO", the flow proceeds to step S21, where a "0" is set to the flag value of the all cylinder region determination flag F_TQCS, and the flow proceeds to step S13 described above.

On the other hand, if this determination is "YES", the flow proceeds to step S22.

In step S22, it is determined whether the power plant required torque final value TQPPRQF is less than or equal to the high cylinder deactivation upper limit torque TQACSH of the cylinder deactivation upper limit torque TQACS having hysteresis or not.

If the determination in step S22 is "NO", the flow proceeds to step S21, where a "0" is set to the flag value of the all cylinder region determination flag F_TQCS, and the flow proceeds to step S13 described above.

On the other hand, if this determination is "YES", the flow proceeds to step S23, where a predetermined time value #TMTQCSDL which is the delay time when switching the flag value of the all cylinder region determination flag F_TQCS from "1" to "0" is set to the delay time TTQCSDL, and the series of processing is terminated.

Moreover, in step S24, it is determined whether the time value of the delay time TTQCSDL is zero or not.

If this determination is "YES", the flow proceeds to step S21 described above.

On the other hand if this determination is "NO", the flow proceeds to step S13 described above.

That is, the arrangement is such that, the flag value of the all cylinder region determination flag F_TQCS is switched from "1" to "0" according to the time value of the delay time TTQCSDL so as to suppress the generation of hunting which frequently switches between the all cylinders operation and the cylinders deactivation operation, and even if the power plant required torque final value TQPPRQF is greater than the low cylinder deactivation upper limit torque TQACSL, the cylinders deactivation operation is permitted so as to improve the fuel consumption efficiency.

Hereunder is a description of processing of the cylinder deactivation control based on the flag value of the torque hold flag F_CCKTQS, with reference to the flowcharts.

Figure 5:
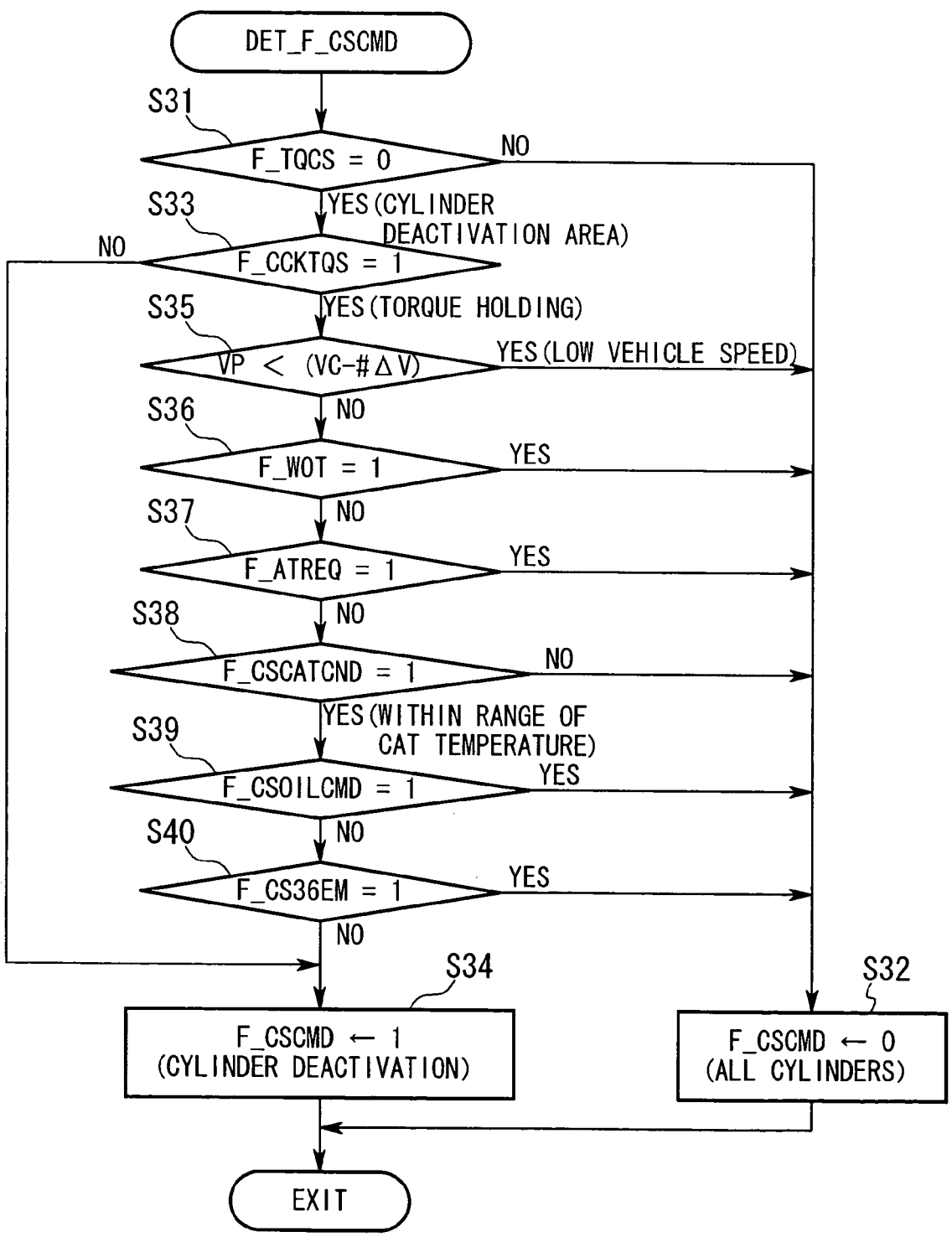
FIG. 5 is a flowchart showing a processing of a cylinders deactivation control based on the torque hold flag F_CCKTQS.

Firstly, in step S31 shown in FIG. 5, it is determined whether the flag value of the all cylinder region determination flag F_TQCS which shows the power plant required torque final value TQPPRQF is in the all cylinders operation region, is "0" or not.

If this determination is "NO" (all cylinder region, with cylinder deactivation prohibited), the flow proceeds to step S32, where a "0" is set to the flag value of a cylinder deactivation request flag F_CSCMD which requests execution of the cylinders deactivation operation for the internal-combustion engine E, and the operating state of the internal-combustion engine E is switched from the cylinders deactivation operation to the all cylinders operation, and the series of processing are terminated.

On the other hand, if this determination is "YES" (cylinder deactivation region), the flow proceeds to step S33.

In step S33, it is determined whether the flag value of the torque hold flag F_CCKTQS is "1" or not.

If the determination in step S33 is "NO", the flow proceeds to step S34, where a "1" is set to the flag value of the cylinder deactivation request flag F_CSCMD which requests execution of the cylinders deactivation operation for the internal-combustion engine E, and the series of processing is terminated.

On the other hand, if the determination in step S33 is "YES", the flow proceeds to step S35.

In step S35, it is determined whether the vehicle speed VP is less than a value obtained by subtracting from the set vehicle speed VC which is the target vehicle speed during cruise control, a predetermined vehicle speed #ΔV (for example, #ΔV=3 km/h or the like) or not.

If the determination in step S35 is "YES", the flow proceeds to step S32 described above.

On the other hand, if the determination in step S35 is "NO", the flow proceeds to step S36.

Moreover, in step S36, it is determined whether a "1" is set to the flag value of a flag F_WOT which shows switching from the stoichiometric state to the rich side state in the A/F (air/fuel ratio) control of the air-fuel mixture supplied to the internal-combustion engine E, or not.

If this determination is "YES", that is, in the case where there is a requirement for switching from the stoichiometric state to the rich side state with respect to the air/fuel ratio, it is determined that the processing for continuing the cylinders deactivation operation is unnecessary, and the flow proceeds to step S32 described above.

On the other hand, if this determination is "NO", the flow proceeds to step S37.

In step S37, it is determined whether a "1" is set to the flag value of a flag F_ATREQ which instructs to prohibit execution of the cylinder deactivation, in order to suppress the generation of torque fluctuations at the time of the shift operation of the automatic transmission (AT) or the like, or not.

If the determination in step S37 is "YES", that is, in the case where the instruction is to prohibit execution of the cylinder deactivation related to the shift operation of the automatic transmission (AT), the flow proceeds to step S32 described above.

On the other hand, if the determination in step S37 is "NO", the flow proceeds to step S38.

In step S38, it is determined whether a "1" is set to the flag value of a flag F_CSCATCND which shows that a temperature TCAT of a catalyst for purifying HC, CO, $NO_x$ and the like in the exhaust gas is, for example within a predetermined temperature range greater than a predetermined activation temperature and less than a predetermined upper limit temperature, or not.

If this determination "NO", that is, in the case where the temperature TCAT of the catalyst is out of the predetermined temperature range, the flow proceeds to step S32 described above.

On the other hand, if this determination is "YES", the flow proceeds to step S39.

In step S39, it is determined whether a "1" is set to the flag value of a flag F_CSOILCMD which shows, for example that the duration of the cylinders deactivation operation exceeds a predetermined duration, or not.

If the determination in step S39 is "YES", it is determined that due for example to the duration of the cylinders deactivation operation exceeding the predetermined duration, there is a likelihood of a decrease in the operating oil in a bank on one side, in the state where three cylinders are deactivated, and the flow proceeds to step S32 described above.

On the other hand, if the determination in step S39 is "NO", the flow proceeds to step S40.

In step S40, it is determined whether or not a "1" is set to the flag value of a flag F_CS36INT which instructs to switch from the cylinders deactivation operation to the all cylinders operation, corresponding to an over decrease in the engine rotating speed NE due for example to rapid deceleration or the like.

If the determination in step S40 is "YES", the flow proceeds to step S32 described above.

On the other hand, if the determination in step S40 is "NO", the flow proceeds to step S34 described above.

Figure 6:
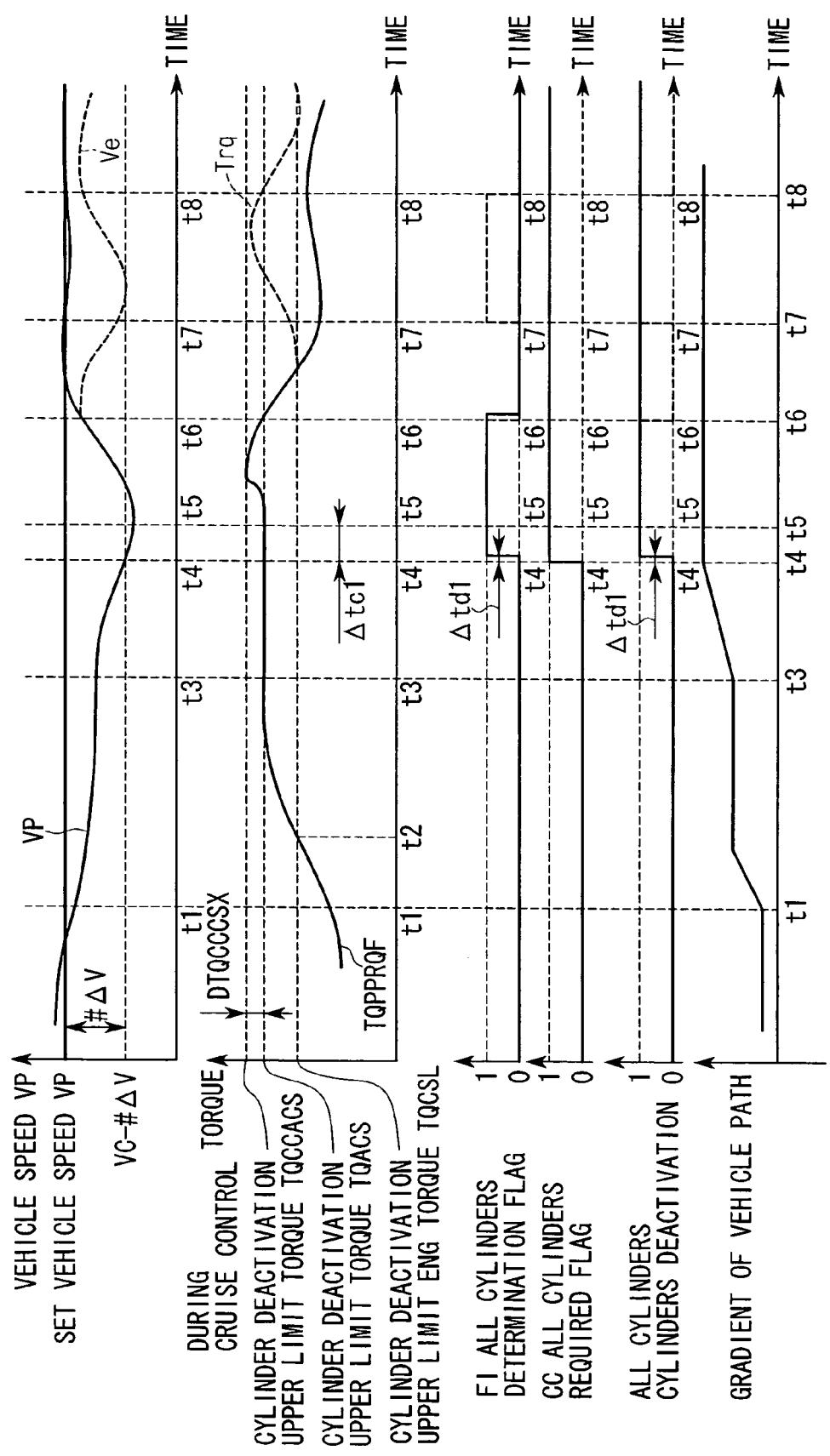
FIG. 6 is a graph showing an example of change with time during cruise control of: vehicle speed VP, power plant required torque final value TQPPRQF, a flag value of an FI all cylinders determination flag, a flag value of a CC all cylinders required flag, an actual operating state of the internal-combustion engine E, and a gradient of a vehicle path.

That is, in a state where the cylinders deactivation operation of the internal-combustion engine E is executed during cruise control for constant speed traveling which controls the internal-combustion engine E and the motor M so that the vehicle speed VP becomes a predetermined set vehicle speed VC, then for example, if the vehicle path become a gradient such as after time t1 shown in FIG. 6, the vehicle speed VP changes in a decreasing trend and the power plant required torque final value TQPPRQF which is the target torque for the torque output from the power plant changes in an increasing trend.

Moreover, for example similarly to the period after time t2 shown in FIG. 6, if the power plant required torque final value TQPPRQF becomes greater than the cylinder deactivation upper limit ENG torque TQCS which is the ENG torque capable of being output from the internal-combustion engine E during the cylinders deactivation operation (for example, the low cylinder deactivation upper limit ENG torque TQCSL of the cylinder deactivation upper limit ENG torque TQCS having hysteresis), the torque value of the difference between the power plant required torque final value TQPPRQF and the cylinder deactivation upper limit ENG torque TQCS is set to the motor required torque, and the cylinder deactivation upper limit ENG torque TQCS is set to the engine required torque, and as a result, the period becomes the cylinder deactivation enlargement assistance region to continue the cylinders deactivation operating state.

Furthermore, in this cylinder deactivation enlargement assistance region, the FI/AT/MGECU 36, for example similarly to the period after time t3 shown in FIG. 6, even in a case where, with a further increase in the vehicle path gradient and the vehicle speed VP further changing in the decreasing trend, the torque required for the vehicle speed VP to follow the predetermined set vehicle speed VC is increased, in the case where the vehicle speed VP is greater than a value obtained by subtracting from the set vehicle speed VC, the predetermined vehicle speed #ΔV (for example, #ΔV=3 km/h or the like), the power plant required torque final value TQPPRQF is controlled not to increase above a predetermined torque value, for example a torque value equivalent to the high cylinder deactivation upper limit torque TQACSH of the cylinder deactivation upper limit torque TQACS having hysteresis, and the power plant required torque final value TQPPRQF is held to a predetermined torque value, for example a torque value equivalent to the high cylinder deactivation upper limit torque TQACSH.

At this time, in the case where, for example the driver required value exceeds the C/C required torque due to rapid acceleration according to the accelerator pedal operation of the driver, the flag value of the cruise control determination flag F_TQCC becomes a "0" so that the determination in step S15 described above becomes "NO", and the power plant required torque final value TQPPRQF is not held to the predetermined torque value, and as a result, the power plant required torque final value TQPPRQF becomes in the all cylinders operating state, at the point in time for example when the high cylinder deactivation upper limit torque TQACSH of the cylinder deactivation upper limit torque TQACS having hysteresis is exceeded.

Moreover, for example similarly to the time t4 shown in FIG. 6, at the point in time when the vehicle speed VP becomes less than a value obtained by subtracting from the set vehicle speed VC the predetermined vehicle speed #ΔV (for example, #ΔV=3 km/h or the like), then similarly to step S32 described above, a "0" is set to the flag value of the cylinder deactivation request flag F_CSCMD which requests execution of the cylinders deactivation operation for the internal-combustion engine E, and a "1" is set to the flag value of the all cylinders required flag which instructs to set the operating state of the internal-combustion engine E to the all cylinders operation during cruise control. Accompanying this, at the point in time when a predetermined control delay time Δtd1 has passed from the time t4, the internal-combustion engine E is actually switched from the cylinders deactivation operation to the all cylinders operation, and further, a "1" is set to the flag value of a FI all cylinders determination flag which determines the operating state of the internal-combustion engine E, according to whether the power plant required torque final value TQPPRQF is greater than the cylinder deactivation upper limit torque TQACS or not.

Here, during the period from t4 when a "1" is set to the flag value of the CC all cylinders required flag to t5 when the predetermined duration Δtc1 has passed, by continuing the state of torque hold which holds the power plant required torque final value TQPPRQF to the predetermined torque value, for example a torque value equivalent to the high cylinder deactivation upper limit torque TQACSH, then rapid torque fluctuation can be kept from being generated when switching the internal-combustion engine E from the cylinders deactivation operation to the all cylinders operation.

Furthermore, for example similarly to the period after time t5 shown in FIG. 6, the state of torque hold is cancelled, and accompanying an increase in the power plant required torque final value TQPPRQF so that the vehicle speed VP follows the predetermined set vehicle speed VC, the difference between the vehicle speed VP and the predetermined set vehicle speed VC changes in a decreasing trend. Then, when the difference between the vehicle speed VP and the predetermined set vehicle speed VC becomes less than a predetermined difference, the power plant required torque final value TQPPRQF changes in a decreasing trend.

Here, for example similarly to the period after time t5 shown in FIG. 6, since the power plant required torque final value TQPPRQF becomes less than, for example the low cylinder deactivation upper limit torque TQACSL of the cylinder deactivation upper limit torque TQACS having hysteresis, then even in a case where a "0" is set to the flag value of the FI all cylinders determination flag, the FI/AT/MGECU 36 continues the state where a "1" is set to the flag value of the CC all cylinders required flag, that is where a "0" is set to the flag value of the cylinder deactivation request flag F_CSCMD, and continues the actual operating state of the internal-combustion engine E being in the all cylinders operation. Therefore, the vehicle speed VP becomes a stable value to follow the predetermined set vehicle speed VC, and the power plant required torque final value TQPPRQF becomes stable at a value less than, for example the cylinder deactivation upper limit ENG torque TQCS.

That is, in the period after time t6 shown in FIG. 6, for example if the actual operating state of the internal-combustion engine E is switched from the all cylinders operation to the cylinders deactivation operation according to the change in the flag value of the FI all cylinders determination flag, then in the vehicle speed VP and the power plant required torque final value TQPPRQF, for example as shown by the broken line Ve and the broken line Trq shown in FIG. 6, hunting occurs which fluctuates repeatedly at a relatively large rise and fall, and with this the actual operating state of the internal-combustion engine E is frequently switched between the all cylinders operation and the cylinders deactivation operation. To counter this, as described above, in the state where a "1" is set to the flag value of the CC all cylinders required flag, that is a "0" is set to the flag value of the cylinder deactivation request flag F_CSCMD, the FI/AT/MGECU 36 continues the actual operating state of the internal-combustion engine E in the state of all cylinders operation, so as to prevent the occurrence of hunting.

As described above, according to the control apparatus for a hybrid vehicle according to the present embodiment, even if the case where the power plant required torque final value TQPPRQF becomes greater than the cylinder deactivation upper limit torque TQACS, by allowing deceleration to a level where occupants in the vehicle can not feel discomfort, the cylinders deactivation operation can be continued and the timing for switching from the cylinders deactivation operation to the all cylinders operation can be delayed, so that fuel consumption efficiency can be improved.

Moreover, it is possible to suppress the occurrence of hunting where switching between the all cylinders operation and the cylinders deactivation operation is frequently repeated, so that the occupants in the vehicle can be kept from feeling discomfort with respect to travelling behavior.

In the embodiment described above, in step S32, the arrangement is such as to set a "0" to the flag value of the cylinder deactivation request flag F_CSCMD so as to switch the operating state of the internal-combustion engine E from the cylinders deactivation operation to the all cylinders operation. However, the arrangement is not limited to this, and it may be for example so as to set the fuel supply to restart for some of the cylinders in the deactivating state, instead of switching to the all cylinders operation.

In the embodiment described above, the arrangement is such that the energy management discharge torque limit for the cylinder deactivation enlargement assistance TQMLTCSA which is the upper limit of the motor torque, is a predetermined fixed value set according to, for example the energy state in high voltage electrical equipment or the operating state of vehicle. However, the arrangement is not limited to this, and for example as a modified example of the embodiment described above, the energy management discharge torque limit for cylinder deactivation enlargement assistance TQMLTCSA which is the upper value of the motor torque, may be changed according to the state of charge QBAT of the battery 3.

Figure 7:
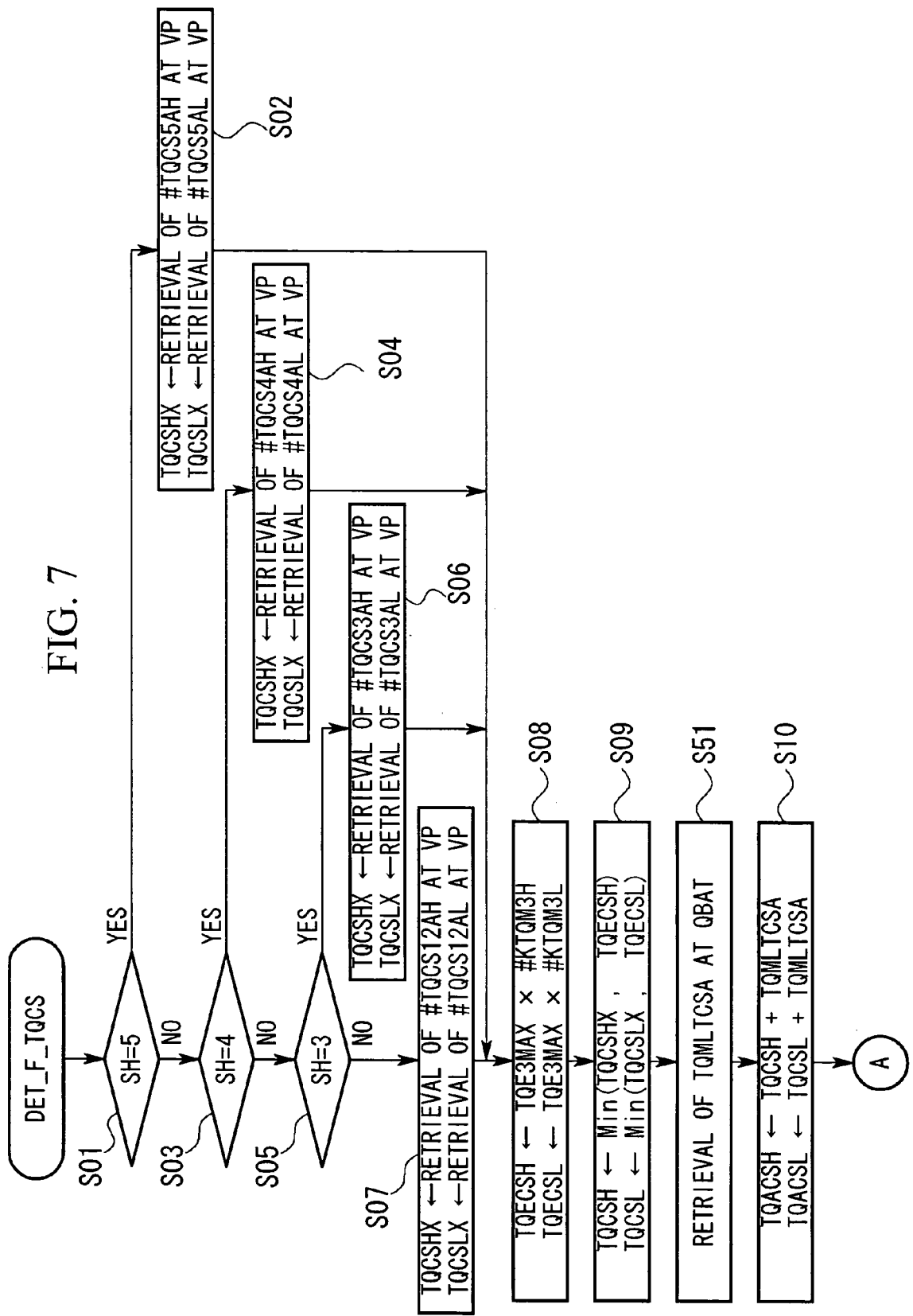
FIG. 7 is a flowchart showing a processing which sets the torque hold flag F_CCKTQS according to a modified example of an embodiment of the present invention.

In this modified example, for example as shown in FIG. 7, in the processing which sets the flag value of the torque hold flag F_CCKTQS showing whether it is possible to execute the torque hold processing which enlarges the cylinders deactivation operation region with respect to the vehicle speed VP during cruise control or not, the processing of step S51 is executed between the processing of step S09 and the processing of step S10 in the embodiment described above.

In this step S51, for example a table # TQMLTCSA of the energy management discharge torque limit for cylinder deactivation enlargement assistance TQMLTCSA which changes in an increasing trend with an increase in the state of charge QBAT of the battery 3 detected by the HVECU 35, is retrieved so as to set the energy management discharge torque limit for cylinder deactivation enlargement assistance TQMLTCSA according to the detected state of charge QBAT.

Figure 8:
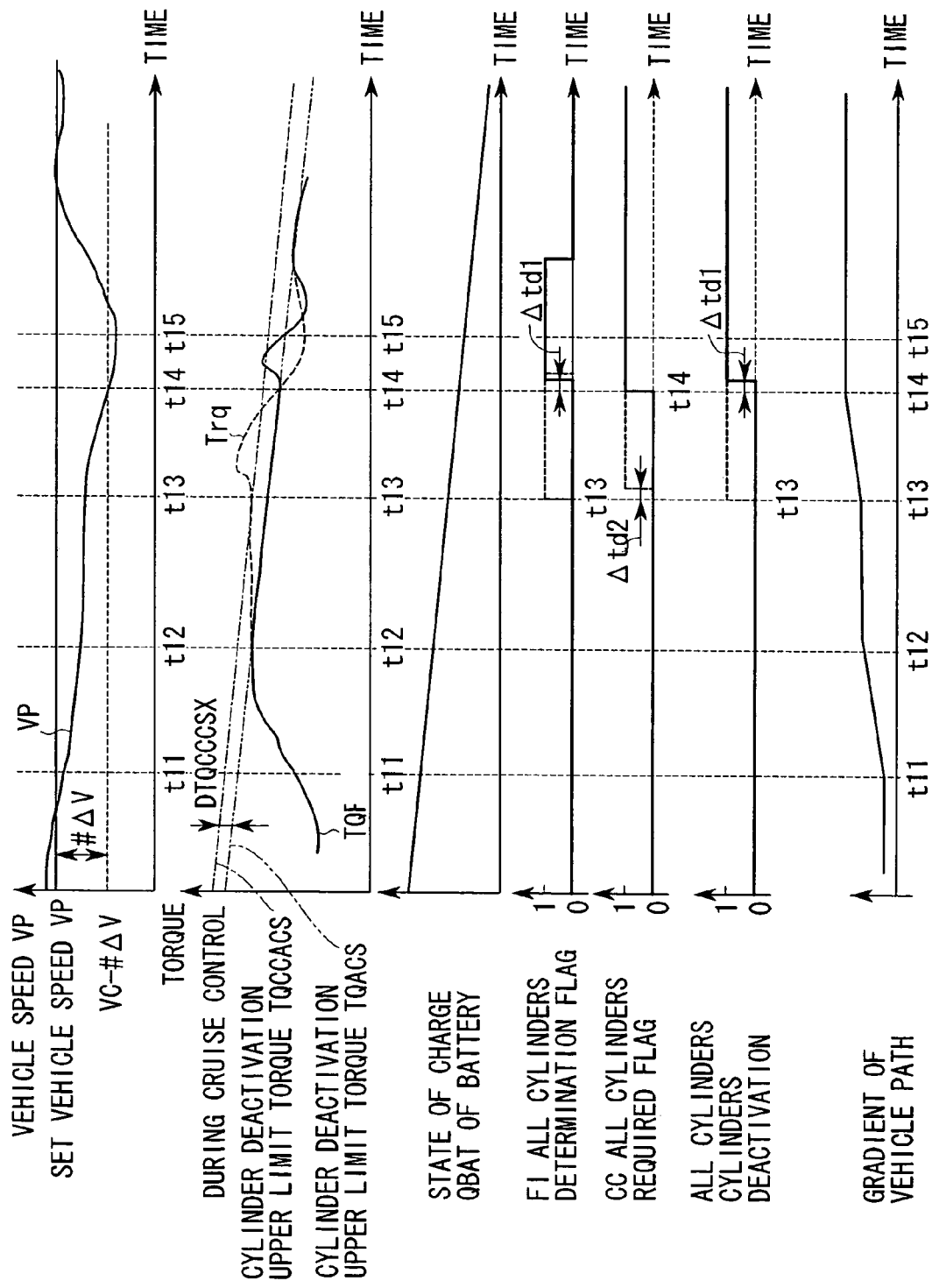
FIG. 8 is a graph according to a modified example of an embodiment of the present invention, showing the change with time during cruise control of; the vehicle speed VP, the power plant required torque final value TQPPRQF, the flag value of the FI all cylinders determination flag, the flag value of the CC all cylinders required flag, the actual operating state of the internal-combustion engine E, and the gradient of the vehicle path track.

That is, in the state of the cylinder deactivation enlargement assistance region which is the state where the cylinders deactivation operation of the internal-combustion engine E is executed during cruise control for constant travelling which controls the internal-combustion engine E and the motor M so that the vehicle speed VP becomes a predetermined set vehicle speed VC, and further the power plant required torque final value TQPPRQF becomes greater then the cylinder deactivation upper limit ENG torque TQCS which is the ENG torque capable of being output from the internal-combustion engine E during the cylinders deactivation operation (for example, the low cylinder deactivation upper limit ENG torque TQCSL of the cylinder deactivation upper limit ENG torque TQCS having hysteresis), and the torque value of the difference between the power plant required torque final value TQPPRQF and the cylinder deactivation upper limit ENG torque TQCS is set to the motor required torque, and the cylinder deactivation upper limit ENG torque TQCS is set to the engine required torque so as to continue the cylinders deactivation operating state, then similarly to the period after time t11 shown in FIG. 8, if the vehicle path is a gradient, the vehicle speed VP changes in a decreasing trend and the power plant required torque final value TQPPRQF which is the target torque for the torque output from the power plant changes in an increasing trend. Furthermore, at this time, by driving the motor M by the power supply from the battery 3, the state of charge QBAT of the battery 3 changes in a decreasing trend, and according to this state of charge QBAT, the energy management discharge torque limit for cylinder deactivation enlargement assistance TQMLTCSA, the cylinder deactivation upper limit torque TQACS, and the cylinder deactivation upper limit torque during cruise control TQCCACS change in a decreasing trend.

Furthermore, in this cylinder deactivation enlargement assistance region, the FI/AT/MGECU 36, for example similarly to the period after time t11 shown in FIG. 8, even in a case where, with a further increase in the vehicle path gradient and the vehicle speed VP further changing in the decreasing trend, the torque required for the vehicle speed VP to follow the predetermined set vehicle speed VC is increased, in the case where the vehicle speed VP is greater than a value obtained by subtracting from the set vehicle speed VC, the predetermined vehicle speed #ΔV (for example, #ΔV=3 km/h or the like), the power plant required torque final value TQPPRQF is controlled not to increase above a predetermined torque value, for example a torque value equivalent to the high cylinder deactivation upper limit torque TQACSH of the cylinder deactivation upper limit torque TQACS having hysteresis, and the power plant required torque final value TQPPRQF is held to a predetermined torque value, for example a torque value equivalent to the high cylinder deactivation upper limit torque TQACSH.

Here, as the cylinder deactivation upper limit torque TQACS changes in a decreasing trend, the power plant required torque final value TQPPRQF changes in a decreasing trend.

Moreover, for example similarly to the period after time t13 shown in FIG. 8, at the point in time when the gradient of the vehicle path is further increased and the vehicle speed VP further changes in a decreasing trend, and similarly to the time t14 shown in FIG. 8, the vehicle speed VP becomes less than a value obtained by subtracting from the set vehicle speed VC a predetermined vehicle speed #ΔV (for example, #ΔV=3 km/h or the like), similarly to the step S32 described above, a "0" is set to the flag value of the cylinder deactivation request flag F_CSCMD which requests execution of the cylinders deactivation operation for the internal-combustion engine E, and a "1" is set to the flag value of the all cylinders required flag which instructs to set the operating state of the internal-combustion engine E to the all cylinders operation during cruise control. Accompanying this, at the point in time when a predetermined control delay time Δtd1 has passed from the time t14, the internal-combustion engine E is actually switched from the cylinders deactivation operation to the all cylinders operation, and further a "1" is set to the flag value of the FI all cylinders determination flag which determines the operating state of the internal-combustion engine E, according to whether the power plant required torque final value TQPPRQF is greater than the cylinder deactivation upper limit torque TQACS or not.

Furthermore, for example similarly to the period after time t14 shown in FIG. 8, the state of torque hold is cancelled, and accompanying an increase in the power plant required torque final value TQPPRQF so that the vehicle speed VP follows the predetermined set vehicle speed VC, an increase in the difference between the vehicle speed VP and the predetermined set vehicle speed VC is suppressed. With the change of this difference in a decreasing trend, the power plant required torque final value TQPPRQF changes in a decreasing trend.

Here, for example similarly to the period after time t15 shown in FIG. 8, even in the case where the power plant required torque final value TQPPRQF becomes less than, for example the low cylinder deactivation upper limit torque TQACSL of the cylinder deactivation upper limit torque TQACS having hysteresis, the FI/AT/MGECU 36 continues the state where a "1" is set to the flag value of the CC all cylinders required flag, that is where a "0" is set to the flag value of the cylinder deactivation request flag F_CSCMD, and continues the actual operating state of the internal-combustion engine E being in the all cylinders operation.

That is, in the period after time t12 shown in FIG. 8, for example, if a predetermined value is set to the energy management discharge torque limit for cylinder deactivation enlargement assistance TQMLTCSA irrespective of the state of charge QBAT of the battery 3 which changes in a decreasing trend, the cylinder deactivation upper limit torque TQACS and the deactivation upper limit torque during cruise control TQCCACS based on this energy management discharge torque limit for cylinder deactivation enlargement assistance TQMLTCSA becomes unchanged regardless of the change of the state of charge QBAT. Accompanying this, for example as shown by the broken line Trq shown in FIG. 8, the power plant required torque final value TQPPRQF becomes unchanged regardless of the change in the state of charge QBAT. However, accompanying the change in the state of charge QBAT in the actual battery 3 in a decreasing trend, the actual cylinder deactivation upper limit torque TQACS and the cylinder deactivation upper limit torque during cruise control TQCCACS change in a decreasing trend. Therefore, for example similarly to time t13 shown in FIG. 8, as shown by the broken line Trq, the power plant required torque final value TQPPRQF reaches to the actual cylinder deactivation upper limit torque during cruise control TQCCACS, and as a result, it is determined by the FI/AT/MGECU 36 that it is difficult to continue the state of the cylinder deactivation enlargement assistance region. Therefore, according to whether the power plant required torque final value TQPPRQF becomes more than the cylinder deactivation upper limit torque TQACS or not, a "1" is set to the flag value of the FI all cylinders determination flag which determines the operating state of the internal-combustion engine E, and the internal-combustion engine E is actually switched from the cylinders deactivation operation to the all cylinders operation , and a "1" is set to the flag value of the CC all cylinders required flag at the point in time when a suitable control delay time Δtd2 has passed from the time t13. That is, in the state of the cylinder deactivation enlargement assistance region, at a timing prior reaching the time t14 when the vehicle speed VP becomes less than a value obtained by subtracting from the set vehicle speed VC a predetermined vehicle speed #ΔV (for example, #ΔV=3 km/h or the like), the processing of the cylinder deactivation enlargement assistance is cancelled. To counter this, as with the modified example described above, by calculating the energy management discharge torque limit for cylinder deactivation enlargement assistance TQMLTCSA according to the state of charge QBAT of the battery 3, the processing of the cylinder deactivation enlargement assistance can be appropriately continued.

Figure 9:
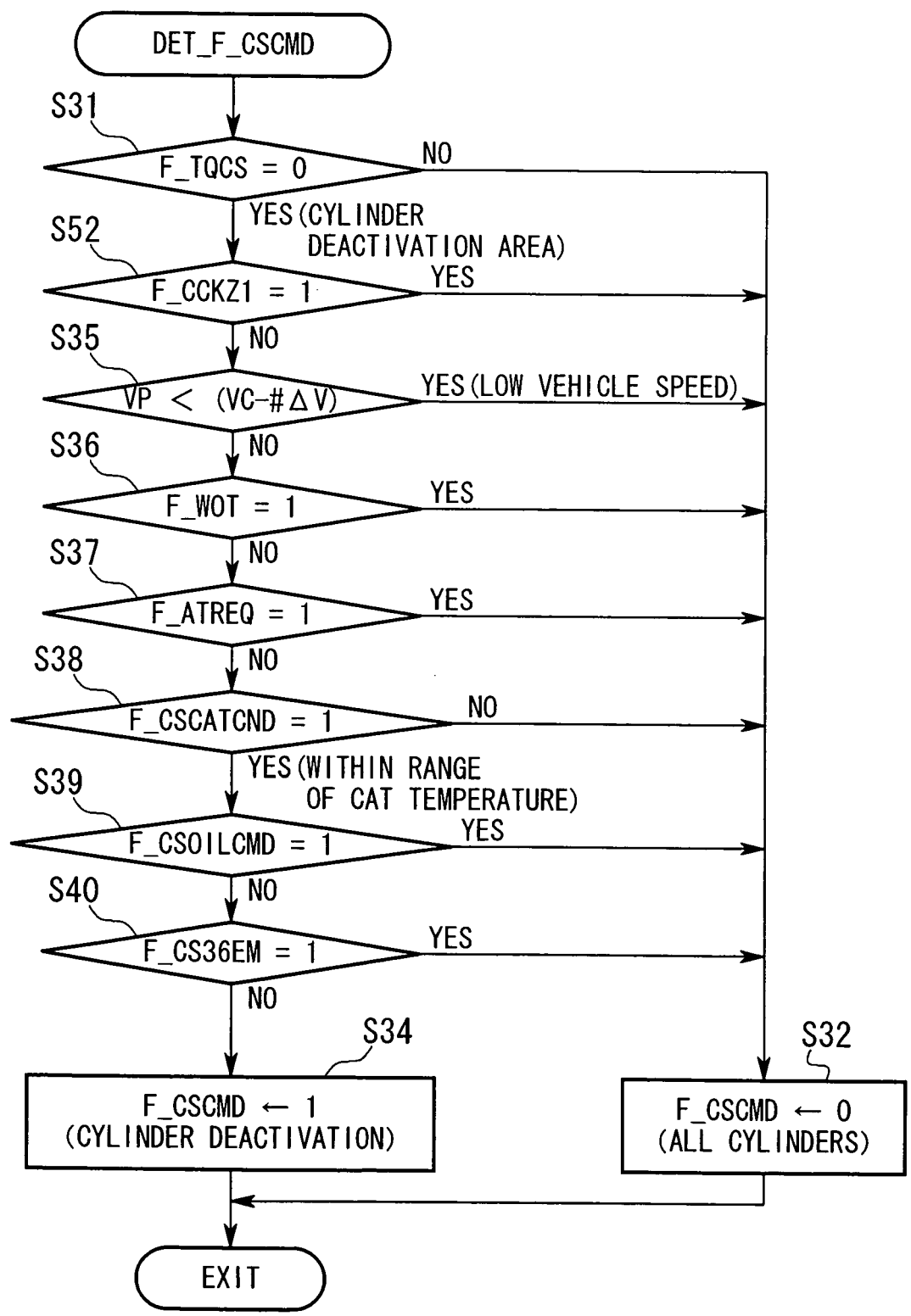
FIG. 9 is a flowchart showing a processing of a cylinders deactivation control according to a modified example of an embodiment of the present invention.

In the modified example described above, in the processing which sets the flag value of the cylinder deactivation request flag F_CSCMD which requests execution of the cylinders deactivation operation for the internal-combustion engine E, then for example as shown in FIG. 9, instead of the torque hold flag F_CCKTQS in the embodiment described above, according to the flag value of an all cylinders instruction flag during cruise control F_CCKZ1 which instructs to set the operating state of the internal-combustion engine E to the all cylinders operation during cruise control, the processing for the cylinder deactivation control may be executed. In this case, instead of the processing in step S33 in the embodiment described above, the processing in step S52 is executed.

In this step S52, it is determined whether the flag value of the all cylinders instruction flag during cruise control F_CCKZ1 is "1" or not.

If this determination is "YES", the flow proceeds to step S32.

On the other hand, if this determination is "NO", the flow proceeds to step S35.

As described above, according to the control apparatus for a hybrid vehicle of the present invention, even in the case where the target torque for the power plant torque exceeds for example the cylinder deactivation upper limit torque, by allowing deceleration to a level where occupants in the vehicle can not feel discomfort, the cylinders deactivation operation can be continued and the timing for switching from the cylinders deactivation operation to the all cylinders operation can be delayed, so that fuel consumption efficiency can be improved.

Furthermore, according to the control apparatus for a hybrid vehicle of the present invention, it is possible to generate a driving force unerringly reflecting the driver's intention to accelerate at an appropriate timing.

Moreover, according to the control apparatus for a hybrid vehicle of the present invention, it is possible to control the operating state of the internal-combustion engine appropriately and flexibly according to the state of the vehicle.

Furthermore, according to the control apparatus for a hybrid vehicle of the present invention, it is possible to suppress the occurrence of hunting where canceling and releasing of canceling of the fuel supply is alternatively repeated, and it is possible to keep occupants in the vehicle from feeling discomfort with respect to the traveling behavior.

Furthermore, according to the control apparatus for a hybrid vehicle of the present invention, it is possible to appropriately continue processing of the cylinder deactivation enlargement assistance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle which includes: a variable cylinder internal-combustion engine capable of switching between an all cylinders operation which operates all cylinders and a cylinders deactivation operation which operates with some cylinders deactivated, and a motor as a power source; and a power storage unit which transfers electric energy with said motor, and at least one of said variable cylinder internal-combustion engine and said motor is connected to driving wheels of the vehicle through a transmission so as to transmit a driving force to said driving wheels, wherein said control apparatus comprises:

a fuel supply canceling device which cancels fuel supply to said some cylinders according to an operating state of the vehicle;

a cruise control device which controls at least one of a cruise control to drive the vehicle so that the vehicle speed follows a predetermined target speed, and a cruise control to make said vehicle travel while maintaining a predetermined vehicular gap with respect to a preceding vehicle;

an upper limit engine torque calculating device which calculates an upper limit value of an engine torque capable of being output from said variable cylinder internal-combustion engine during said cylinders deactivation operation;

an upper limit motor torque calculating device which calculates an upper limit value of motor torque capable of being output from said motor during an assisting operation which assists the output of said variable cylinders internal-combustion engine by the output from said motor;

a torque limiting device which limits a target torque for a power plant torque capable of being output from a power plant comprising said variable cylinder internal-combustion engine and said motor during operation of said fuel supply canceling device and said cruise control to under a value equivalent to a predetermined torque related to a cylinder deactivation upper limit torque obtained by adding the upper limit value of said engine torque and the upper limit value of said motor torque; and a fuel supply cancel releasing device which releases cancellation of the fuel supply to at least some of the cylinders among said cylinders to which the fuel supply is cancelled by said fuel supply canceling device, when said vehicle speed is decreased under a speed obtained by subtracting from said target speed, a predetermined speed during operation of said torque limiting device.

2. A control apparatus for a hybrid vehicle according to claim 1, wherein said fuel supply cancel releasing device cancels the operation of said fuel supply canceling device to thereby switch the operating state of said variable cylinder internal-combustion engine from the cylinders deactivation operation to the all cylinders operation.

3. A control apparatus for a hybrid vehicle according to claim 1, wherein said fuel supply canceling device, in at least one case of: a case where the air/fuel ratio of an air-fuel mixture supplied to said variable cylinder internal-combustion engine is changed from a theoretical air/fuel ratio to a rich side state; a case where a shift operation is executed in said transmission; a case where a temperature of a catalyst which purifies exhaust gas of said variable cylinder internal-combustion engine departs from a predetermined activation temperature range; a case where a duration of said cylinders deactivation operation exceeds a predetermined duration; and a case where a rotating speed of said variable cylinder internal-combustion engine is decreased to under a predetermined rotating speed, releases the cancellation of the fuel supply to at least some of the cylinders among said cylinders to which the fuel supply is cancelled by said fuel supply canceling device.

4. A control apparatus for a hybrid vehicle according to claim 1, further comprising: a fuel supply cancel prohibiting device which, after said fuel supply cancel releasing device releases the cancellation of the fuel supply to at least some of the cylinders among said cylinders to which the fuel supply is cancelled by said fuel supply canceling device, prohibits execution of the cancellation of fuel supply to said at least some of the cylinders to which the cancellation of the fuel supply is released by said fuel supply cancel releasing device.

5. A control apparatus for a hybrid vehicle according to claim 1, wherein said upper limit value of motor torque is calculated according to a state of charge of said power storage unit.

* * * * *